United States Patent Office 2,988,515
Patented June 13, 1961

2,988,515
ELECTROLUMINESCENT PHOSPHOR
Anselm Wachtel, Parlin, N.J., assignor to Westinghouse Electric Corporation, East Pittsburgh, Pa., a corporation of Pennsylvania
No Drawing. Filed Sept. 29, 1958, Ser. No. 763,794
2 Claims. (Cl. 252—301.4)

This invention relates to phosphors for electroluminescent devices and, more particularly, to red-emitting electroluminescent phosphors.

The phenomenon of electroluminescence was first disclosed by G. Destriau, one of his earlier publications appearing in London, Edinburgh and Dublin Philosophical Magazine, Series 7, vol. 38, No. 285, pages 700–737 (October 1947). Since this publication, considerable improvements have been made in electroluminescent devices and in the phosphors used therewith. There is still lacking, however, a good red-emitting electroluminescent phosphor. The closest approach to such a phosphor is an orange-emitting, copper-activated, zinc selenide phosphor. This phosphor suffers from the disadvantages of extreme toxicity because of the selenides and poor output under low frequency excitation. It has been reported that additions of small amounts of cadmium to this zinc selenide phosphor shift the electroluminescence toward the deep red, but in such a case, a considerable amount of energy is lost in the infrared because of the rather broad emission spectrum of this phosphor.

It is the general object of this invention to avoid and overcome the foregoing and other difficulties of and objections to the prior-art practices by the provision of a red-emitting electroluminescent phosphor which can be processed from comparatively non-hazardous materials.

It is another object to provide a red-emitting electroluminescent phosphor having a narrow emission spectrum which is peaked at about 6540 A.U.

The aforesaid objects of the invention, and other objects which will become apparent as the description proceeds, are achieved by providing a phosphor comprising calcium sulfide activated by europium and copper. Also provided are permissible and optimum activator proportions.

As noted, the red-emitting electroluminescent phosphor of this invention comprises calcium sulfide activated by europium and copper. The europium content can vary from 0.01 mole percent to 1 mole percent of the calcium sulfide with the optimum europium content being about 0.04 mole percent of the calcium sulfide. The copper activator content can vary from 0.5 to 5 mole percent of the calcium sulfide with about 1.5 mole percent of copper activator being optimum.

Preparation of the phosphor is somewhat involved and two preferred methods have been practiced with good success, although it is probable that the phosphor can be prepared by other varying methods. In the first preferred method for preparing the present phosphor, finely-divided calcium sulfide, which forms the primary phosphor raw-mix constituent, is admixed with a europium compound by admixing a predetermined amount of calcium sufide such as ten grams, for example, with sufficient finely-divided europium nitrate, for example, to provide from 0.01 to 1 mole percent and preferably about 0.04 mole percent of europium. The europium compound such as europium nitrate desirably is initially evenly admixed with sulphur by means of an aqueous slurry and thereafter dried, in order to facilitate its being added to the calcium sulfide in small amounts without wetting same. The calcium sulfide is desirably chosen to have fairly large agglomerates and such material is well known. In addition, one mole percent of ammonium bromide or 0.5 mole percent of calcium bromide is added as a flux and ammonium or calcium chlorides or iodides can be used in varying amounts to replace the bromide flux. The foregoing compounds are thoroughly and evenly mixed and fired at a temperature of from about 1000° C. to about 1100° C. for about one hour, with the optimum firing temperature being about 1050° C. The firing is conducted in a covered silica tube which is provided with an inert atmosphere such as nitrogen or noble gas. In order to insure that substantially no oxygen is present, sulphur is desirably added to the raw mix before firing. The amount of sulphur is in no way critical and as an example, 10% by weight of the calcium sulfide can be added. This first firing produces a photoluminescent phosphor which is non-electroluminescent. Thus these initially-fired constituents can be classed as a raw mix as far as electroluminescent response is concerned.

After firing, the initially-fired, raw-mix constituents are gently crushed and washed with anhydrous alcohol. Methanol is preferred although ethanol or other higher alcohols can be used provided they are solvents for calcium chloride, bromide or iodide. The washing process is desirably conducted with a decantation technique wherein the phosphor is suspended in the alcohol and thereafter allowed to settle, after which the supernatant liquid is decanted. In this decantation washing process, it is desirable to discard the ultrafine phosphor particles, such as those not settling in a period of one minute. The alhohol-wet, fired calcium sulfide-europium compound then has added thereto copper compound in predetermined has added thereto copper compound in predetermined amount. As an example, the copper activator is desirably added in non-aqueous solution in such amount as to provide from 0.5 to 5 mole percent and preferably 1.5 mole percent of copper with respect to the calcium sulfide. In the preferred method, the copper chloride or bromide is dissolved in anhydrous alcohol such as methanol for example to form a 0.2 molar solution of copper halide in 10 cc. of methanol. This solution is added to the alcohol-wet sulfide-europium, first-fired material to form a suspension. The formed suspension is then boiled and during this boiling process, a small portion of the calcium sulfide reacts with the copper halide to form insoluble copper sulfide and calcium halide. The insoluble copper sulfide precipitates and deposits on the calcium sulfide and discolors same and the boiling is continued until substantially all of the copper is precipitated and deposited as copper sulfide onto the finely-divided calcium sulfide-europium material. The foregoing deposition process can be carried out in alcohols other than methanol such as anhydrous ethanol or higher alcohols. After the copper is substantially deposited, a small amount of ammonium sulfide solution, such as one drop, may be added for the purpose of completing the precipitation of any copper remaining in solution. This produces a calcium sulfide-europium material which has a very even surface coating of copper sulfide. This material is then washed with anhydrous methanol or higher anhydrous alcohol as indicated hereinbefore and thereafter it is desirably washed with acetone. The washed material is dried in an oven at a temperature desirably not exceeding about 100° C. Ten percent by weight of sulphur, for example, is then added to the dried mixture and it is placed in a silica tube or boat and fired in a nitrogen atmosphere for about ten minutes for example at a temperature of from 900° C. to 1000° C. with the optimum firing temperature being from about 940° C. to about 960° C. Thereafter the fired phosphor is lightly crushed, ultrafines are desirably removed with a decanting procedure as described hereinbefore and the phosphor is thereafter dried and immediately bottled for later incorporation into an electroluminescent cell.

In the second preferred method for preparing the present phosphor, calcium sulfide and europium compound such as europium nitrate are admixed as in the first preferred method outlined hereinbefore. Five mole percent of ammonium borate and five mole percent of calcium bromide are added to the admixed calcium sulfide-europium compound. If desired, ten mole percent of ammonium bromide can be substituted for the calcium bromide. This initial raw mix is then fired in an open silica tube in a nitrogen atmosphere for fifteen minutes and thereafter for forty-five minutes in an atmosphere of hydrogen sulfide, the firing temperatures being from 1000° C. to 1100° C. and preferably about 1050° C. The specified firing times are not critical and can be varied. The initial firing in the nitrogen atmosphere is for the purpose of causing the phosphor to flux and the later firing in hydrogen sulfide serves substantially to deflux the phosphor and remove oxygen therefrom. Thereafter the raw-mix constituents are gently crushed and washed with anhydrous alcohol as in the first method and copper compound in activator proportions is then added as in the first preferred method specified hereinbefore. After the calcium sulfide-europium material with the very even surface coating of copper sufide has been decanted from the acetone and then dried, calcium bromide in amount of from 0.5 mole percent to 3 mole percent of the calcium sulfide may be admixed therewith to serve as a flux, particularly when processing small batches. This admixture is fired for ten minutes in an atmosphere of hydrogen sulfide at a temperature of from 900° C. to 1000° C., with the preferred firing temperature being from 940° C. to 960° C. Thereafter the fired phosphor is lightly crushed, ultrafines are desirably removed with a decanting procedure as specified hereinbefore and the phosphor is dried and immediately bottled for later incorporation into an electroluminescent cell.

In either of the foregoing preferred methods, the addition of copper to the initially-fired calcium sulfide-europium material can also be accomplished by adding finely-divided copper compound such as copper sulfide directly to this initially-fired material. The preferred method of adding the copper by the precipitation technique as described, however, insures a very even distribution of copper throughout the phosphor raw-mix, resulting in normally-improved electroluminescent response.

After preparation, the phosphor can be incorporated into an electroluminescent cell by the usual techniques, such as by spraying an admixture of equal parts by weight of the present phosphor and a dielectric material such as polyvinyl-chloride acetate onto a glass foundation which is coated with an electrically-conducting layer such as tin oxide. An aluminum backing layer is then vacuum-metallized over the phosphor-dielectric. The present phosphor is quite conducting as compared to the usual electroluminescent phosphor and in order to inhibit any tendency for electrical breakdown it is desirable to use a separate layer of insulating material such as mica between the electrodes of the electroluminescent cell incorporating the phosphor. Such electroluminescent cell constructions are well known.

The present phosphor has an electroluminescent emission which is peaked at about 6540 A.U. and the half-width of the response is about 650 A.U. The blue emission normally obtained with a copper activator is suppressed by the europium activator under excitation by 2537 A.U. and with respect to electroluminescent response. The phosphor is not particularly dependent on the frequency of excitation with respect to its light output, with the result that the output is good at relatively low frequencies. The performance of the phosphor is the best when it comprises phosphor agglomerates measuring from about 10 to 100 microns in diameter. Such phosphor agglomerates are readily obtained by utilizing calcium sulfide which has been prepared from raw materials having relatively coarse particles.

Small amounts of other sulfides can be tolerated such as zinc sulfide and alkaline-earth sulfides other than calcium. These small additive amounts of other sulfides will normally shift the emission toward the shorter wave lengths. This may or may not be desirable, depending on the intended application for the phosphor.

It will be recognized that the objects of the invention have been achieved by providing a red-emitting electroluminescent phosphor which can be processed from comparatively non-toxic materials and which has a relatively narrow emission spectrum peaked at about 6540 A.U.

While best embodiments have been described hereinbefore, it is to be particularly understood that the invention is not limited thereto or thereby.

I claim:
1. An electroluminescent phosphor consisting essentially of calcium sulfide activated by from 0.01 to 1 mole percent of europium and from 0.5 to 5 mole percent of copper.
2. An electroluminescent phosphor consisting essentially of calcium sulfide activated by about 0.04 mole percent of europium and about 1.5 mode percent of copper.

References Cited in the file of this patent
UNITED STATES PATENTS

| 2,522,074 | Urbach | Sept. 12, 1950 |
| 2,782,168 | Fetters | Feb. 19, 1957 |

OTHER REFERENCES

Kroger et al.: The Fluorescence of Zinc Sulfide Activated With Copper, Physica, XV, No. 11–12, December 1949, pages 990–1017.